US008644619B2

(12) United States Patent
Thompson et al.

(10) Patent No.: US 8,644,619 B2
(45) Date of Patent: Feb. 4, 2014

(54) KEY BLANK IDENTIFICATION SYSTEM WITH GROOVE SCANNING

(75) Inventors: Chester O. D. Thompson, Painesville, OH (US); William R. Mutch, North Ridgeville, OH (US)

(73) Assignee: Hy-Ko Products Company, Northfield, OH (US)

( * ) Notice: Subject to any disclaimer, the term of this patent is extended or adjusted under 35 U.S.C. 154(b) by 767 days.

(21) Appl. No.: 12/772,709

(22) Filed: May 3, 2010

(65) Prior Publication Data
US 2010/0278437 A1 Nov. 4, 2010

Related U.S. Application Data

(60) Provisional application No. 61/215,152, filed on May 1, 2009, provisional application No. 61/275,654, filed on Sep. 1, 2009.

(51) Int. Cl.
*G06K 9/62* (2006.01)
*G06K 9/00* (2006.01)
*B23C 1/16* (2006.01)
*B23C 1/18* (2006.01)

(52) U.S. Cl.
USPC ............... 382/209; 382/141; 409/81; 409/82; 409/83

(58) Field of Classification Search
USPC .............. 382/205, 209, 110, 141; 409/81–83; 76/110
See application file for complete search history.

(56) References Cited

U.S. PATENT DOCUMENTS

| | | | | |
|---|---|---|---|---|
| 3,884,121 A * | 5/1975 | Agius | ............................. | 409/82 |
| 4,188,163 A * | 2/1980 | Juskevic | ......................... | 409/82 |
| 4,453,432 A * | 6/1984 | Widen | ............................ | 76/110 |
| 4,671,711 A * | 6/1987 | Steinbach et al. | .............. | 409/82 |
| 5,556,240 A * | 9/1996 | Almblad | ......................... | 409/81 |
| 5,671,523 A * | 9/1997 | Juchinewicz | ................... | 29/559 |
| 6,053,677 A * | 4/2000 | Juchinewicz | ................... | 29/76.2 |
| 6,065,911 A * | 5/2000 | Almblad et al. | ................ | 409/83 |
| 7,163,364 B2 * | 1/2007 | Foscan et al. | .................... | 409/81 |
| 7,484,446 B1 * | 2/2009 | Gula | ................................. | 83/414 |
| 7,643,685 B2 * | 1/2010 | Miller | ........................... | 382/209 |
| 2001/0033781 A1 * | 10/2001 | Wills et al. | ...................... | 409/81 |
| 2002/0191849 A1 * | 12/2002 | Campbell et al. | ............. | 382/181 |

* cited by examiner

*Primary Examiner* — Michelle Entezari
(74) *Attorney, Agent, or Firm* — McDonald Hopkins LLC (57) ABSTRACT

A key identification system is provided. The key identification system comprises an imaging system to capture an image of a master key, and a logic to analyze the captured image. The imaging system may be capture an image of a groove in the master key from an angle between perpendicular and parallel to the blade of said master key. The logic analyzes the captured image to compare characteristics of the groove with groove characteristics of known key blanks to determine the likelihood of a match between the master key and a known key blank. The key identification system may further compensate for displacement or orientation of the master key with respect to the imaging system when analyzing characteristics of the groove.

23 Claims, 12 Drawing Sheets

KEY BLANK IDENTIFICATION SYSTEM WITH GROOVE SCANNING

CROSS-REFERENCE TO RELATED APPLICATIONS

This application claims the benefit of priority of U.S. Provisional Patent Application Ser. No. 61/215,152 filed on May 1, 2009, and U.S. Provisional Patent Application Ser. No. 61/275,654 filed on Sep. 1, 2009, each of which are hereby incorporated by reference in their entirety.

FIELD OF ART

This invention relates generally to the field of systems for identifying objects and, more particularly to systems for utilizing electronic means for identifying key blanks that are compatible with an unknown key.

BACKGROUND OF THE INVENTION

The art of key replication is well known. Commonly, a key intended for duplication (the master key) is copied on to an appropriately identified key blank utilizing any number of different systems known in the art. The process of identifying an appropriate key blank to use when making copies of a key can be a difficult, tedious and time consuming affair. It is important that each master key be copied onto the proper key blank so as to prevent numerous adverse consequences caused by reproducing a master key onto an inappropriate key blank. However, choosing the correct key blank can be difficult even for experts in the field.

There are hundreds, if not thousands, of key blanks, and many blanks are not readily distinguished from others. Identifying the correct key blank for use in duplication involves selecting a blank from hundreds or even thousands of possibilities, where differences between key blanks may be very subtle. These hard-to-notice subtleties significantly increase the level of difficulty for all operators of such key replication systems, both inexperienced trainees and experts alike.

Once a key blank is chosen, it goes through a cutting process. The typical cutting process simply traces the profile of the master key onto the key blank, such that the key blank will exactly match (within the error limits and accuracy of the tracing machine) the original master key. Normally, a mechanically linked cutting wheel actually cuts into the key blank while it mimics the movement of the tracer as the tracer moves longitudinally along the profile of the master key. If the incorrect key blank is provided during this process, the key blank being formed into the duplicate key may not possess the correct longitudinal length, thereby causing a failure. When this type of failure occurs, the entire process of selecting a key blank for replication and then mechanically cutting the key must begin again. Worse still, if the blank has the proper length but does not possess the appropriate thickness, contour, groove or other traits, the failure may not be discovered until the key is actually inserted into the lock.

Businesses that offer key cutting services are often times not staffed by experienced locksmiths. Instead, employees are usually trained to "eyeball" what is thought to be the correct blank and then cut a duplicate key. Such informal and imprecise key blank identification invariably increases the rate of failures for the duplication process. These failures often occur at the expense of the industry and to the extreme dismay of the key holder. Therefore, the industry would welcome an easy-to-use key blank identification system that increases the accuracy and efficiency of key replication.

Not surprisingly, numerous attempts have been made to improve identification systems and/or key replication systems. Many of these improvements include imaging systems designed to determine the proper key blank based on physical parameters of the key to be copied, such as length, shape, and groove characteristics.

While many of these systems provide useful improvements for determining a proper key blank, they still suffer from various deficiencies. Specifically, many of these systems compare scanned data from a master key to be copied with data from known key blanks in order to determine if the master key matches the key blank. However, in some instances the scanned key parameters and the key blank data are insufficient to determine a matching key blank. In such cases, additional information about the master key and the key blank would be useful in narrowing the field of prospective key blanks. Accordingly, an improved system and method for determining a key blank is needed.

SUMMARY

A key identification system is provided. The key identification system comprises an imaging system to capture an image of a master key, and a logic to analyze the image. The imaging system may be configured to capture an image of a groove in the key from an angle between perpendicular and parallel to the blade of said master key. The logic analyzes the captured image to compare characteristics of the groove with groove characteristics of known key blanks.

The key identification system may account for the orientation or positioning of the master key with respect to the imaging system or key holder to determine groove characteristics of the master key. For example, the logic may analyze a contour of the groove and determine groove characteristics of the master key based on the contour and the orientation and positioning of the master key.

DESCRIPTION OF THE DRAWINGS

Objects and advantages together with the operation of the invention may be better understood by reference to the following detailed description taken in connection with the following illustrations, wherein.

DETAILED DESCRIPTION OF THE INVENTION

Reference will now be made in detail to exemplary embodiments of the present invention, examples of which are illustrated in the accompanying drawings. It is to be understood that other embodiments may be utilized and structural and functional changes may be made without departing from the respective scope of the present invention.

A system and method for identifying a key blank are provided. The system ("key ID system") analyzes a master key to be duplicated, such as a house key, car key or other key, and determines the appropriate key blank to be used in duplicating the master key. The system and method described herein may be used independently to determine a proper key blank, or may be used in conjunction with other systems to narrow the field of prospective key blanks. Moreover, it will be understood that existing key identification systems may be modified or retrofitted to implement some or all features described herein.

The key ID system may scan a master key to determine traits and characteristics of the master key. Based on these characteristics, the key ID system may then determine the proper key blank to be used to duplicate the master key. The key ID system may include any means known in the art for determining the traits and characteristics of the master key geometry. For example, the key ID system may include an imaging system, such as a camera, laser, or any other imaging system known in the art. The imaging system may scan the master key to determine characteristics of the master key, specifically characteristics that may be unique to a specific key blank. While the key ID system is described herein as including an imaging system, it will be appreciated that other known methods or devices, such as electrical or mechanical sensors, may be used in place of or in conjunction with the imaging system to determine the traits and characteristics of the master key geometry.

Figure 1:
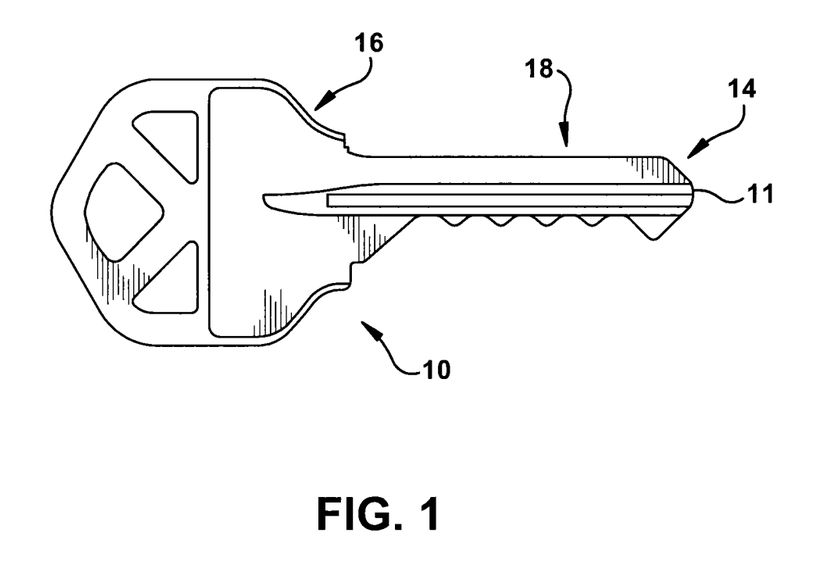
FIG. 1 illustrates a master key.

With reference to FIG. 1, a master key 10 is depicted. The master key 10 may include standard key features such as a head 16 connected to a blade 18 and a groove 11. The groove 11 may comprise a channel, opening, geometric shape, or other indentation formed in the blade 18. A master key 10 may include a single groove 11 on one side of the blade 18, a single groove 11 on each side of the blade 18, multiple grooves 11 on either side of the blade 18, or any other configuration of grooves 11 with respect to the blade 18. Further, it will be appreciated, that the master key 10 may be any key and is not limited to keys having a head 16, blade 18 or groove 11.

Figure 2A:
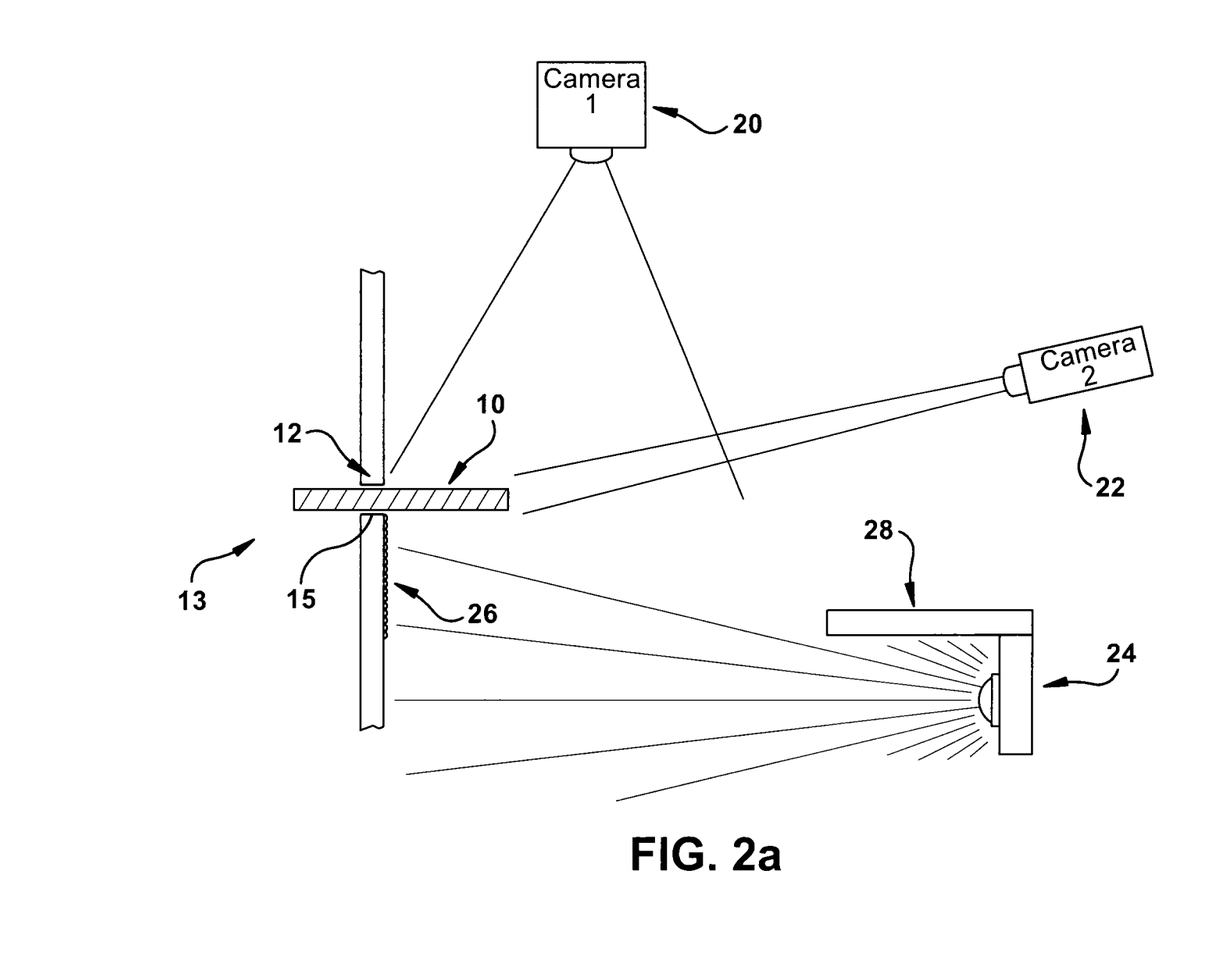
FIG. 2a illustrates a first example configuration of a key ID system.
Figure 2B:
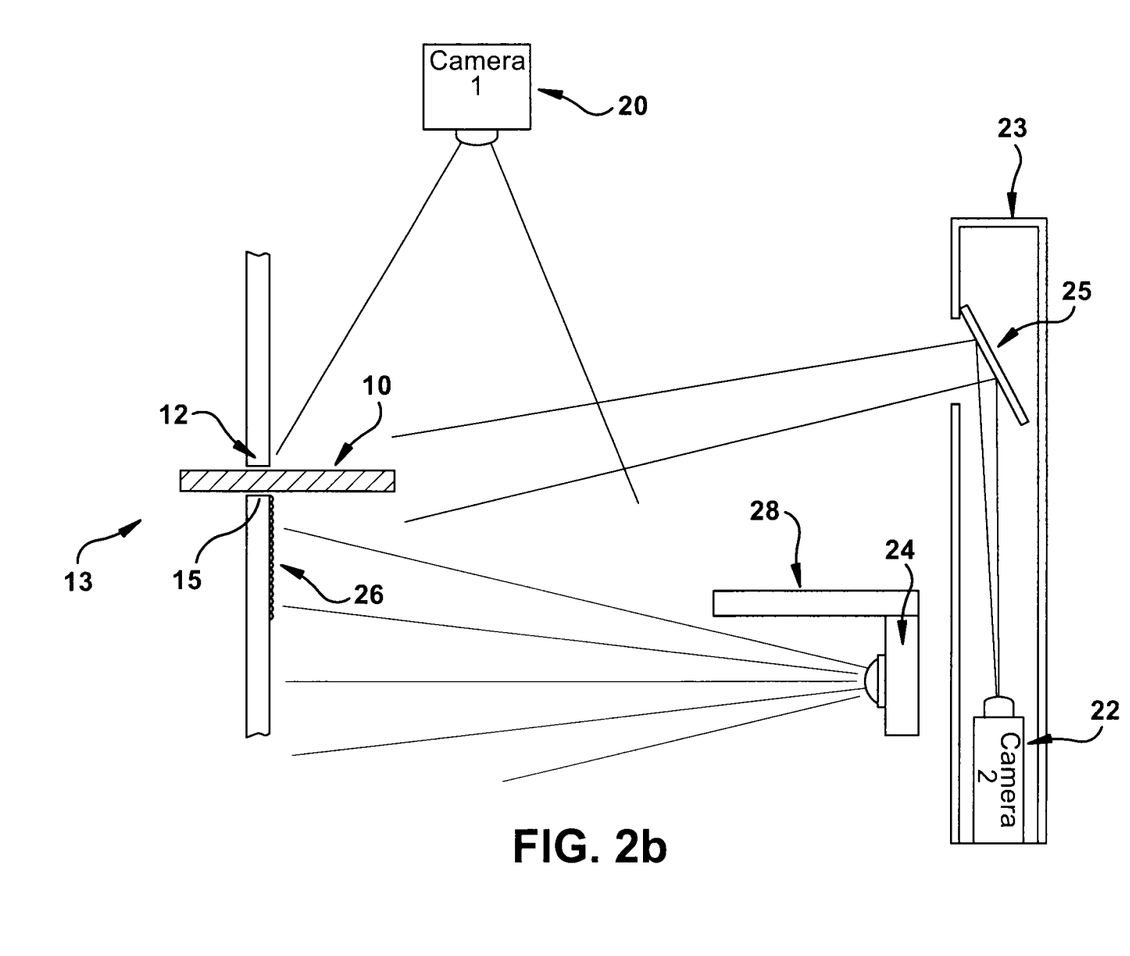
FIG. 2b illustrates a second example configuration of a key ID system.

The key ID system may include a key holder to hold the master key. The key holder may be any device capable of holding or supporting a master key. For example, as shown in FIGS. 2a and 2b, the key holder 13 may comprise a lower support 15 and an upper door 12 to close onto the key. The key holder may alternatively comprise a clamp, gripper, platform, suspension, or any other device configured to hold the master key 10.

In an embodiment, the key ID system includes a camera system. The camera system includes one or more cameras configured to record images, such as digital images, of the master key. The camera system may further include other components to assist in recording images of the master key, such as lights and mirrors. The lights may be positioned to enhance the clarity and quality of the image recorded by the camera. The mirrors may be positioned to allow a camera in a first position to record an image of the key from a second position. The mirrors may further allow a single camera to record multiple images of the master key from different angles, thereby increasing the amount of information related to the master key recorded by a single camera.

The key ID system may include a logic to analyze images captured by the imaging system. As used herein, the term "logic" includes but is not limited to a software, a firmware, an executable program, a hardware or hard-wired circuit, or combinations thereof. For example, based on a desired application or needs, a logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

The logic may be configured to determine a correlation or likelihood of a match between a known key blank and the master key. For example, the logic may include a database to store key related information ("key data"). The key data may include characteristics of known key blanks, such as length, shape, bitting information, size, shape and location of key grooves, and other geometric and physical characteristics of known key blanks. The database may be integral with the logic, in communication with the logic, or remotely accessible to the logic. The database may associate key data with specific key blanks or with types or groups of key blanks. For example, the database may associate key data with specific key manufacturers or different types of keys such as house keys or car keys. The key ID system may access the database to compare scanned characteristics of the master key with the stored key data in the database. Key blanks that do not have characteristics consistent with those of the master key may be then ruled out as possible matches for the key blank. The key ID system may scan the master key 10 one or more angles and compare the scanned data with stored key data.

The key ID system may scan a master key 10 to determine information related to the groove 11. Keys and key blanks commonly include a groove 11 or grooves 11 in the blade 18 of the key. Characteristics of the grooves 11 may be unique to a given key blank or group of key blanks. For example, the size, location, angle, and other geometric parameters of a given groove may be unique to a key blank or blanks. Further, the location of a groove 11 on a first side of the key blade ("top groove") may be unique with respect to the location of a groove 11 on the second side of a key blade ("bottom groove").

The key ID system may analyze various aspects of the groove 11 of a master key 10. For example, the imaging system may capture an image of the groove 11 from a position perpendicular to the key blade 18, as illustrated by the overhead camera 20 in FIG. 2a. This camera angle provides a top view of the blade 18 and allows the overhead camera to scan the length of the groove 11. The imaging system may also capture an image of the groove 11 from the end of the tip 14 at an angle parallel to the blade 18. This angle provides a view of the groove 11 cross-section. However, neither overhead scanning of the groove 11 nor parallel scanning of the groove 11 provide sufficient contrast between the groove 11 and the rest of the key 10 to effectively determine certain parameters of the groove 11.

Figure 3:
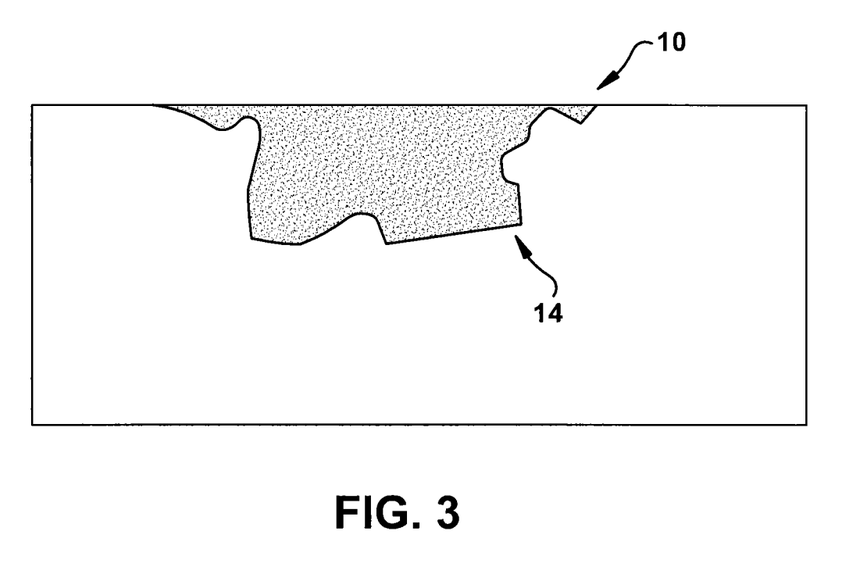
FIG. 3 illustrates an example silhouette of a key tip.

In many keys, a groove 11 extends from the shoulder 16 through the tip 14 of the key 10. Therefore, the shape and contours of the tip geometry reflect characteristics of the groove 11. Accordingly, unique characteristics of a master key may be determined by scanning the tip 14 from an angle designed to capture the top groove or bottom groove characteristics. This may be best accomplished by scanning the tip 14 at an angle other than perpendicular or parallel to the blade 18. For example, as shown in FIG. 2a, the key ID system may include a camera 22 facing the tip 14, and positioned at an angle slightly above parallel to the blade. In an embodiment, the camera is positioned facing the tip of the key 10, between 5 and 15 degrees from parallel to the blade of the key 10. This positioning allows the camera 22 to capture the contours of the tip 14 formed by the bottom groove 11. Alternatively, it will be appreciated that the camera may be positioned similarly underneath the key to capture the contours of the tip 14 formed by the top groove 11. As illustrated in FIG. 3, the camera 22 may capture a silhouette of the bottom groove. This silhouette may be unique to a key blank or group of key blanks, thereby narrowing the field of prospective key blanks.

Figure 4:
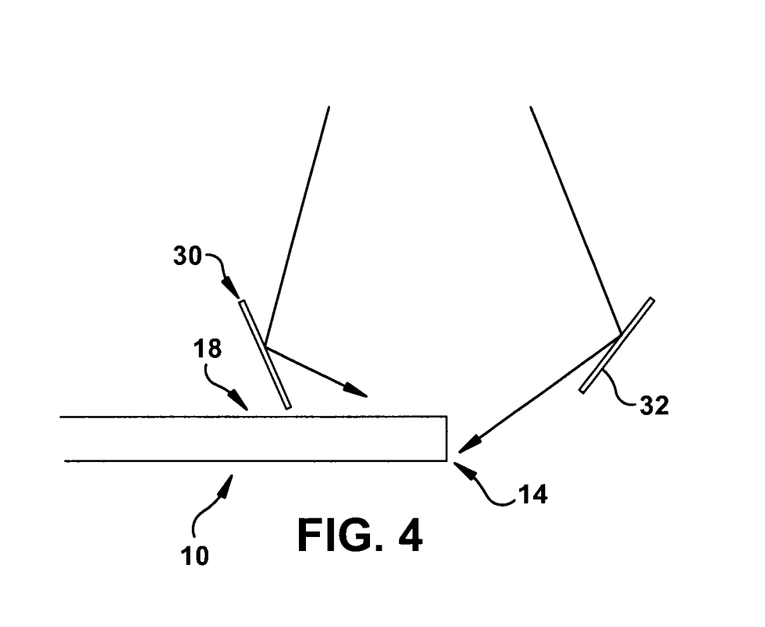
FIG. 4 illustrates an example configuration of a key ID system with reflectors.

It will be appreciated that configurations other than the camera configuration shown in FIG. 2a may be used to capture the tip-groove geometry. For example, the key ID system may include only a groove camera 22 without any overhead camera 20. Further, the key ID system may include a plurality of mirrors to allow a single camera at a remote position to capture multiple angles of the master key, including angles of the tip 14. In an embodiment, as shown in FIG. 4, a first mirror 30 may be positioned to provide a top view of the tip 14 from behind the key 10. A mirror may be similarly positioned below and behind the key 10 to capture an image of the bottom groove 11. This view allows the camera to capture the contours of the tip 14 formed by the top groove 11. A second mirror 32 may also be positioned to provide a top view of the tip 14 from in front of the key 10. This view allows the camera to capture the contours of the tip 14 formed by the bottom groove 11. It will be appreciated that the key ID system may include any number of cameras, mirrors, and other imaging devices to capture the desired views of the contours of the tip 14.

Figure 5:
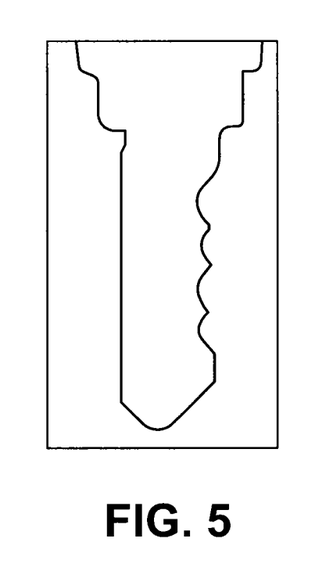
FIG. 5 illustrates an example scanned image of a master key blade silhouette.

In an embodiment, the key ID system scans the master key 10 to capture the silhouette of the blade 18, as shown in FIG. 5. This silhouette is used to determine the outline shape of the tip 14 in order to isolate groove geometry from the tip geometry. The key ID system may also scan the tip 14 from an angled position to capture the contours of the tip 14 formed by the groove 11.

Figure 6:
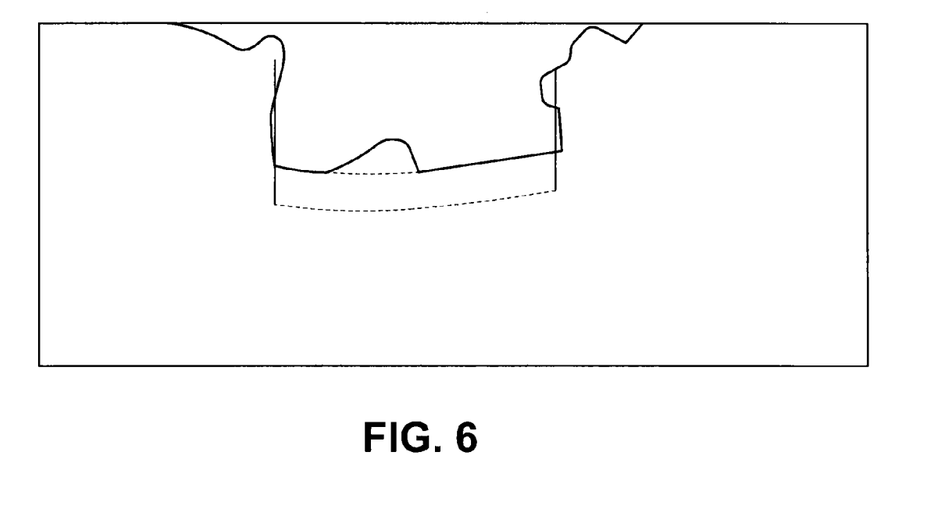
FIG. 6 illustrates an example projection of a tip outline onto the image of a tip.

As shown in FIG. 6, a trigonomic projection of the tip 14 may be used to identify the portion of the tip contour that is due to the groove shape. Specifically, contour data related to contours of the groove 11 may be determined by calculating a set of scalar variables based on image information and machine constants. As described herein, points in the image taken by the overhead camera 20 are mapped to their corresponding points from the image taken from the groove camera 22.

Figure 7:
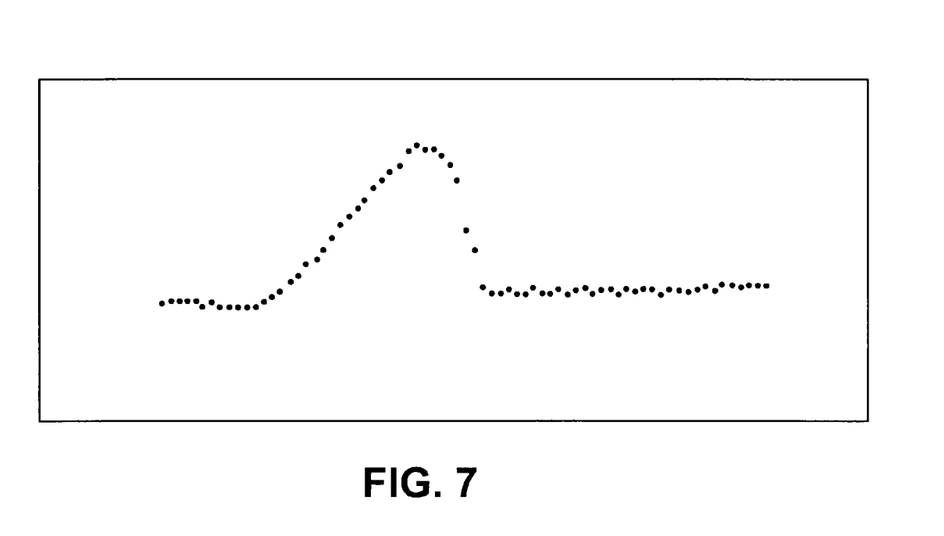
FIG. 7 illustrates an example calculated data set of tip groove contours.
Figure 8:
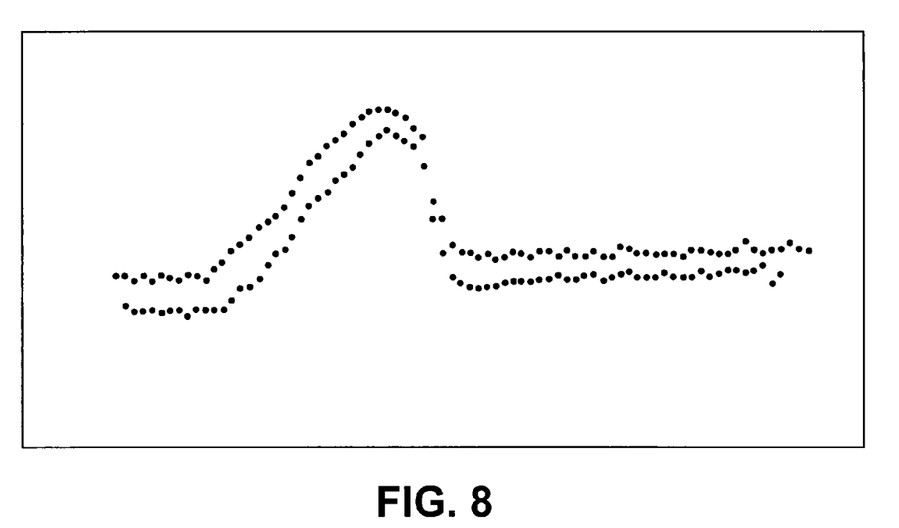
FIG. 8 illustrates an example matching comparison between master key tip contour data and stored key blank data.
Figure 9:
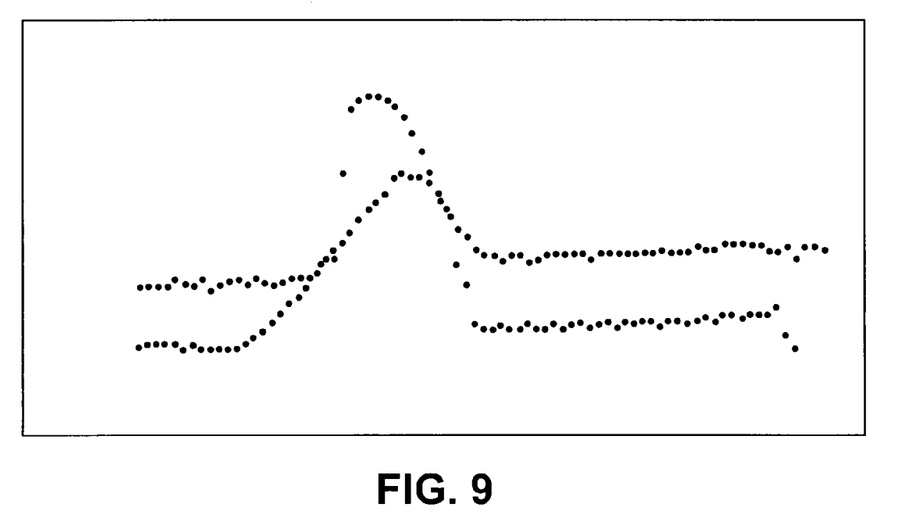
FIG. 9 illustrates an example unmatched comparison between master key tip contour data and stored key blank data.

The contour image may be compiled from data obtained by the overhead or outline camera 20. Once the outline or contour data has been generated, the outline image is rescanned to generate a set of data points, as shown in FIGS. 7-9. For example, data points may be generated every 0.005 inches along the tip of the key. The data point interval of the rescanned or resampled image may be adjusted based on the required accuracy for groove identification and the optical characteristics of the outline and groove cameras. For example, the data point interval may be 0.002 in order to obtain a better defined sample.

The groove contour may be compared to contours of known key blanks stored in the database to determine a matching key blank. Tolerance and/or correlation values may be set to determine if the comparison yields a match. FIG. 8 illustrates a comparison between a scanned key tip contour and stored key data of a known key blank. The statistical correlation value between the data sets is approximately 0.985, indicating a match between the master key and compared key blank. FIG. 9 illustrates another comparison between a scanned key tip contour and stored key data of a known key blank. The statistical correlation value between the data sets here is approximately 0.879, indicating that the master key and compared key blank do not match.

Referring to FIG. 2a, the plane of the overhead camera 20 image intersects the groove camera 22 image at the lower edge of the door opening 12. The overhead camera 20 observes the profile of the key 10 while the groove camera 22 is focused on the tip of the key 10. With reference to FIGS. 10-13, the line at which these two images intersect, referred to as the door axis 52, is a primary axis for purposes of determining contour data. The primary reference or origin point of the door axis is located at the center of the door 12. The plane of the door also passes through this intersection and is by definition perpendicular to the overhead camera 20 image plane.

A silhouette image of the key 10 may be captured by the groove camera 22. To capture the silhouette image, the key ID system may utilize elements such as a light source 24 and a diffuse reflector element 26, as shown in FIGS. 2a and 2b. The light source 24 may be shielded with a light shield 28 to illuminate the reflector element 26 while avoiding the tip of the key 10. In an embodiment, the directional light from the light source 24 is angled to direct the light substantially on the diffuse reflector element 26, but not on the tip of the key 10.

The light source 24 may be any light source known in the art. For example, the light source 24 may be a series of discrete LED lights substantially oriented in a row. It will be appreciated, however, that the light source 24 may be any lights arranged in any configuration. The diffuse reflector element 26 may be affixed to the interior surface of the door, such that when the light from the light source 24 strikes the diffuse reflector element 26, the diffuse reflector element 26 provides a backlit area. In other words, this arrangement provides a backlit area behind the key 10 with respect to the groove camera 22 while minimizing the amount of light that is directed toward the key 10. Thus, the groove camera 22 may view the key 10 tip as a substantially dark or black feature, similar to that shown in FIG. 3. It will be appreciated, however, that the key ID system may include any additional lights, such as backlights, positioned throughout the system.

With reference to FIG. 2b, an alternative configuration for the key ID system is shown. The groove camera 22 may be mounted in a vertical camera box 23. The vertical camera box 23 mounts the groove camera 22 at the bottom directed upward toward a mirror 25 mounted at the other end of the vertical camera box 23. The mirror 25 is directed toward the key 10 tip, such that the angle of incidence is nominally about 15 degrees. However, it will be appreciated that the angle of incidence upon the key 10 of the image may be any angle, preferably between approximately 5 degrees and approximately 45 degrees.

Figure 14:
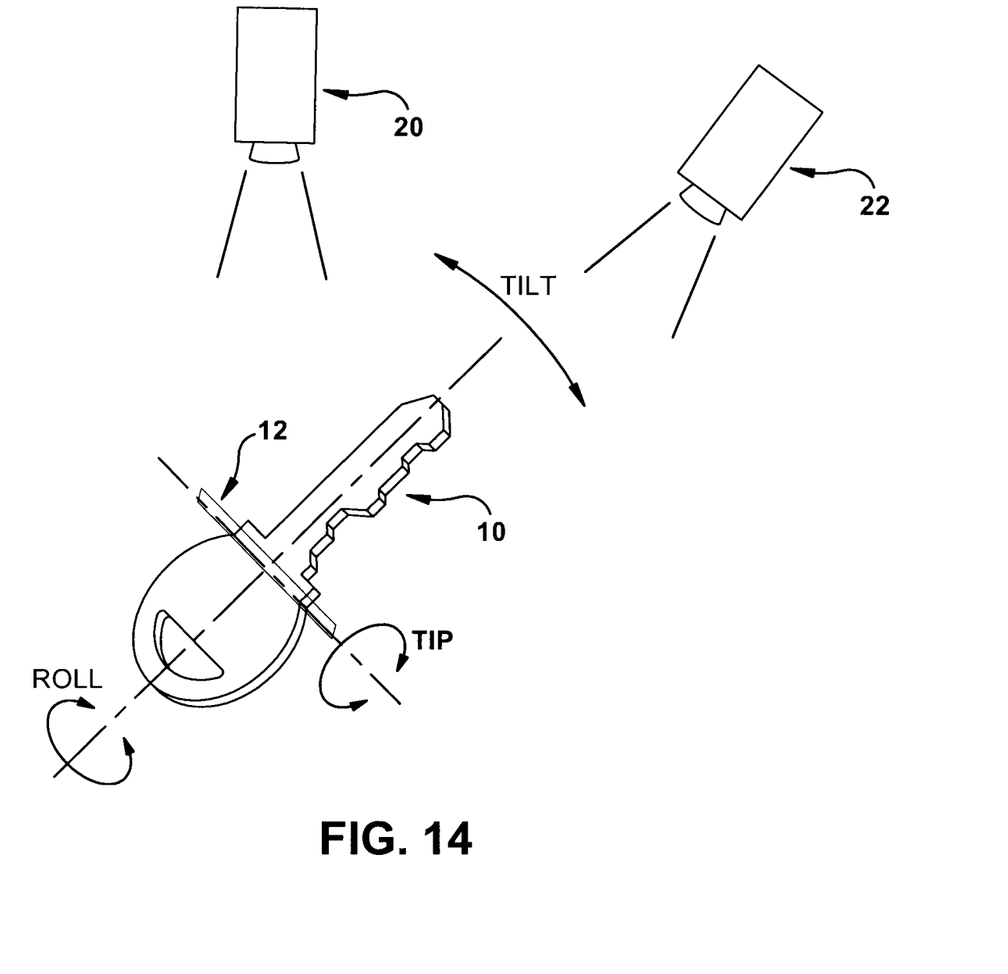
FIG. 14 illustrates an angular coordinate system for a master key.

The key 10 is not constrained to a particular orientation or position when held within the key holder 13. With reference to FIG. 14, the key may be tilted or yawed in a plane perpendicular to the orientation of the outline camera 20; tipped up or down relative to the plane defined perpendicular to the door opening 12; and rotated around the axis of the key blank itself (rolled) or combinations of any of the preceding as well as variations caused by the overall length of the key blade 10 that would position the tip of the key at various focus positions relative to the groove camera 22. Thus it is necessary to correct for the optical distortions and transform the images obtained from the two different cameras to obtain an effective image of the tip 14.

The concept of a vanishing point is used to handle the foreshortening of the key 10 when viewed by the groove camera 22. The effects of this foreshortening vary greatly as the end of the key 10 is tipped up or down slightly by the clamping action of the door 12. The distance from the door to the vanishing point may be substantially affected by this tipping action.

To compensate for the angle between the groove camera 22 and the key 10, the distance from the tip of the key to the door axis is readily determined for both the overhead camera 20 image and groove camera 22 image. The ratio of these distances (hereinafter "GrooveLR") is dependent both on the angle between the groove camera 22 angle and the key tipping angle. The actual values of these angles may be ignored because only the ratio is required for the calculations to compensate for the key location.

In an embodiment, a groove image vanishing point may be determined by multiplying the distance to the outline image vanishing point by the ratio GrooveLR. The outline image vanishing point may first be empirically determined. For example, previous test indicate a sample outline image vanishing point to be 20 inches from the origin of the door axis. The outline image vanishing point depends on the configuration of the key ID system and the characteristics of the cameras. Vanishing points may be assumed to be on the door centerline axis. However, in other embodiments vanishing points may be offset from the door centerline axis with additional compensation.

FIGS. 10-13 illustrate a crop box 50 used for limiting the image of the key 10. An example of an outline crop box 50 is shown in FIG. 5, where the outline crop box 50 defines the outer periphery of the image. The outline crop box functions to limit the image that is actually processed by the system, even though the actual image captured by the camera is larger than the outline crop box 50. The outline vanishing point is far to the left of the outline crop box 50 along its X axis shown as point 52. The groove vanishing point is above the groove crop box 60, shown in FIG. 6, along it Y axis at point 62. The groove crop box 60, serves a similar function to the outline crop box 50, namely it reduces the overall image processed by the system to a subset of the actual image captured, in this case by the groove camera 22. This outline image vanishing point distance is combined with vOutX to calculate the x axis distance from the vanishing point to the starting point. While a specific method determining the vanishing points and associated distances is described, it will be appreciated that other methods may be used.

Figure 10:
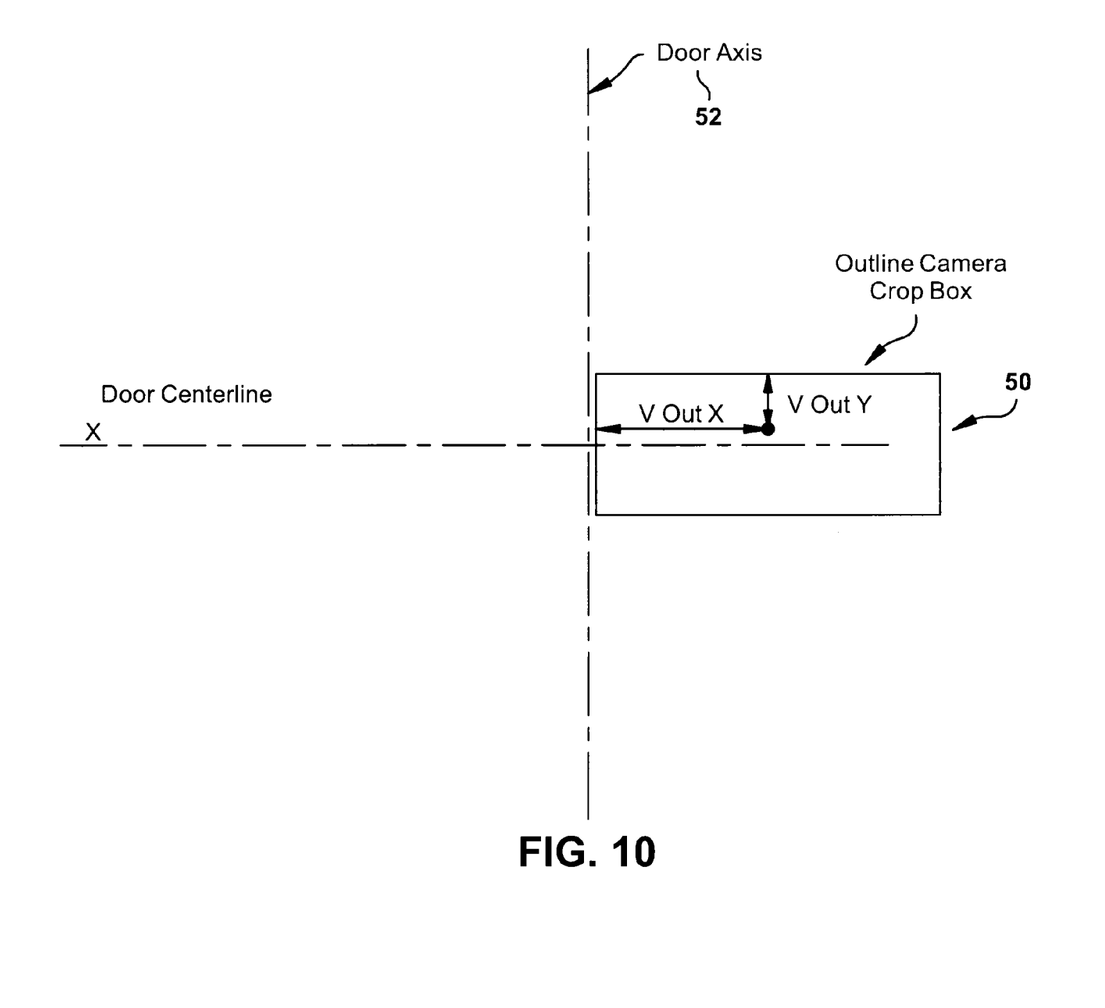
FIG. 10 illustrates the coordinate references for the outline camera image.

FIG. 10 shows the position of the starting location relative to the door axis and the Outline Camera image. vOutX and vOutY are the x and y coordinates of a point at the tip of a key image that is to be mapped to the groove image. These points correspond to the set of data points that define the tip of the key. The units of the outline camera 20 are in pixels. Thus a series of vOutX and vOutY points are created to define the tip of the key.

Figure 11:
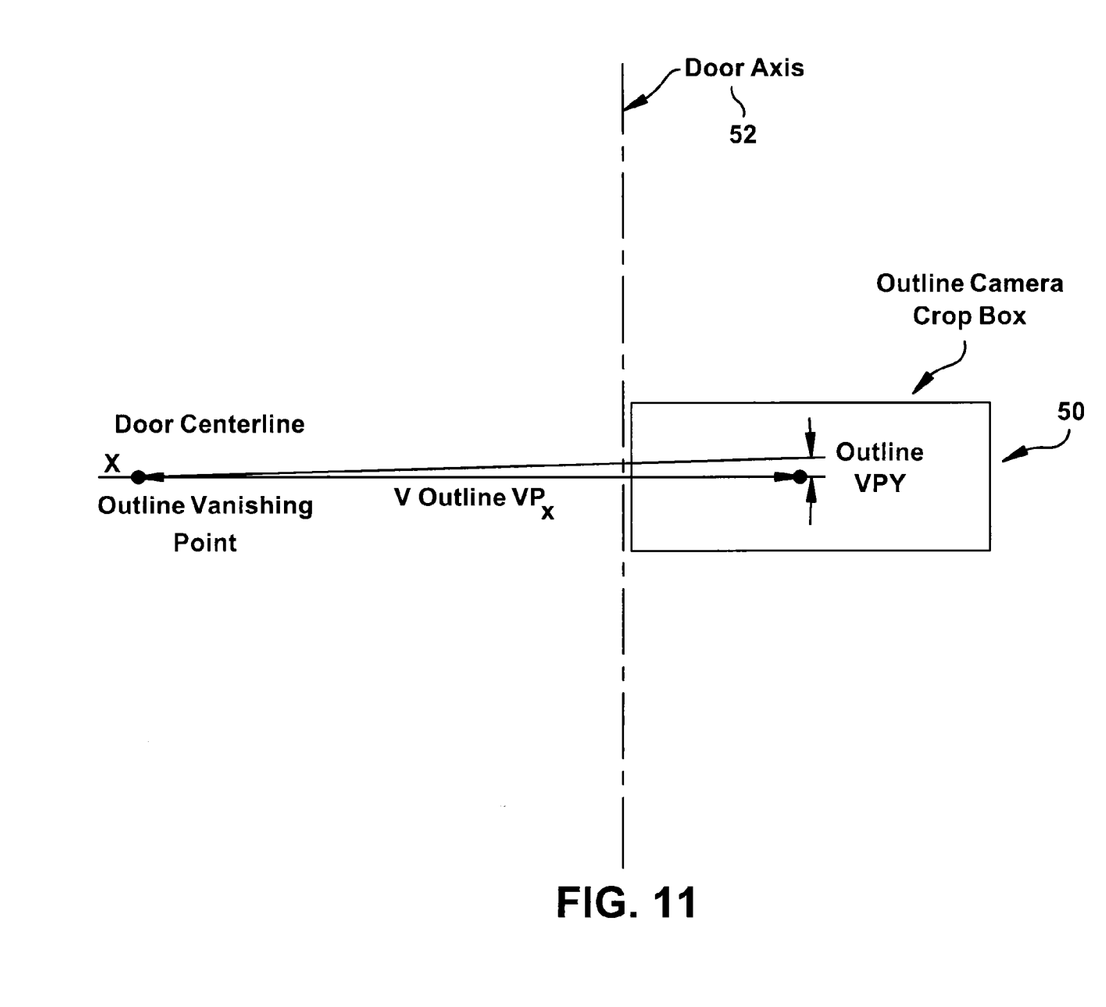
FIG. 11 illustrates the coordinate references for the outline camera image including the outline vanishing point.

FIG. 11 shows the starting point translation to distances from the outline view vanishing point. This distance is multiplied by GrooveLR to yield the outline VPy shown on FIG. 11 and referred to as GVPY (groove image vanishing point distance).

Figure 12:
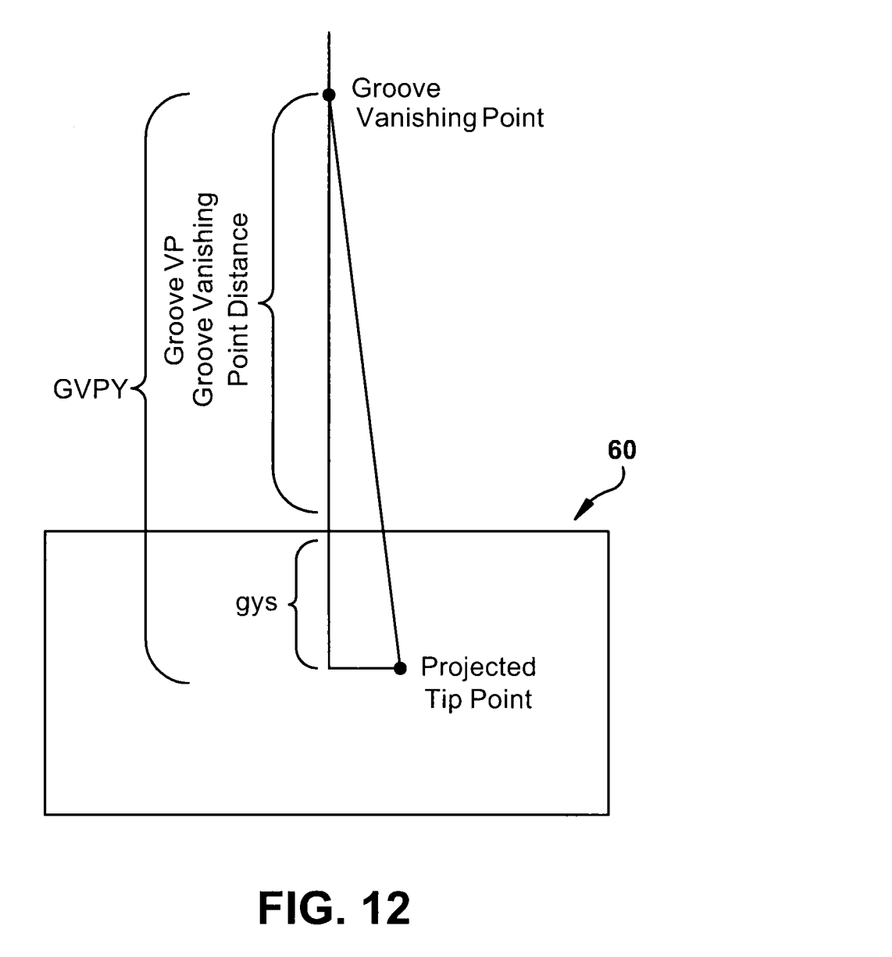
FIG. 12 illustrates the coordinate references for the groove camera image including the groove vanishing point relating to the y-axis projection.

FIG. 12 shows the construction of the projected tip point y axis coordinate. This projection is made on the Groove Camera image plane. The y axis projection is simply the difference between GVPY and GrooveVP.

Figure 13:
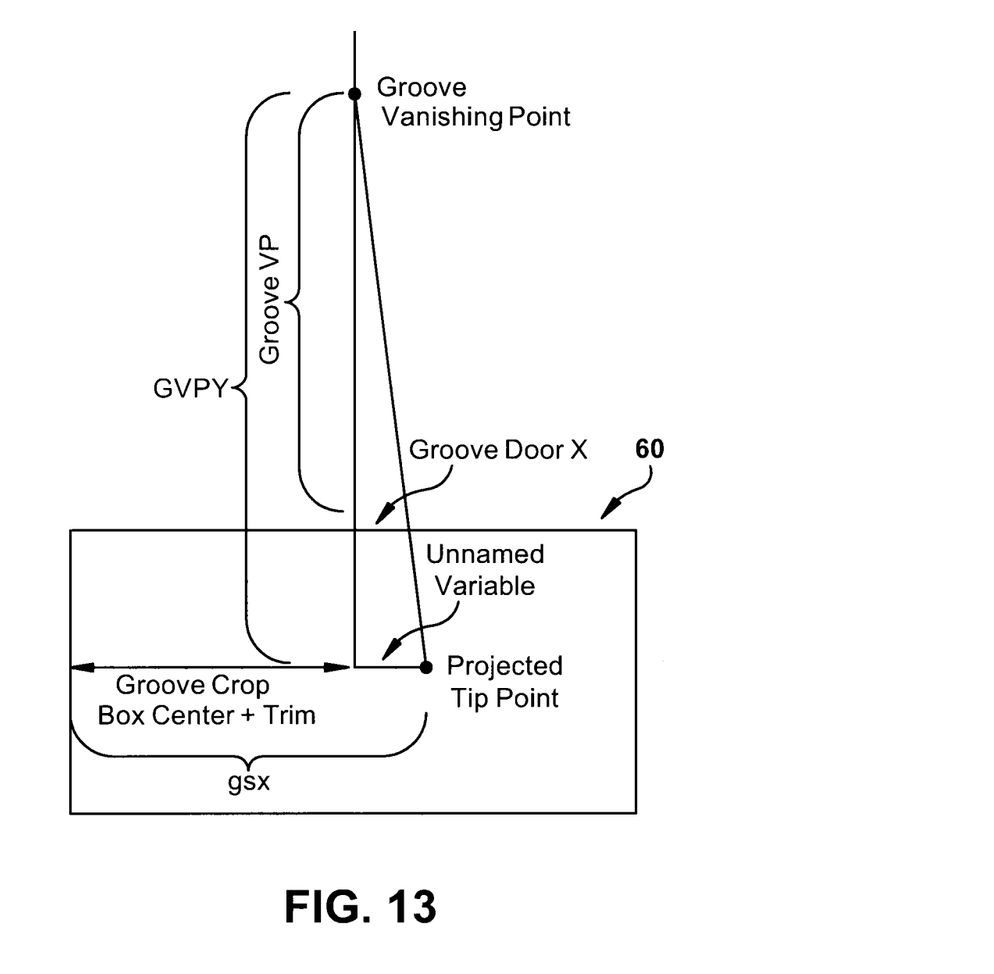
FIG. 13 illustrates the coordinate references for the groove camera image including the groove vanishing point relating to the x-axis projection.

The x axis projection calculation uses the GVPY to GrooveVP ratio as shown in FIG. 13. The Groove Door X distance may be determined from the outline image. The Groove Door X distance may be scaled by the GVPY to GrooveVP ratio and added to the Groove Crop Box Center distance to find gsx which is the x axis coordinate. A trim value may be added to enable small physical offsets to be adjusted during machine calibration.

Once each point on the outline camera 20 image has been mapped to the groove camera 22 image, the groove contour data may be determined. FIG. 6 shows a typical groove image with two rows on points drawn at its tip. The row that is touching the tip may be calculated using the method described here. The lower row may be extrapolated from the same data points.

The groove contour is found by measuring the distance from a point that is eight pixels below the mapped point to the actual white to black edge in the groove image. Giving the edge detection software the extra pixels allows it to readily find a transition and allows for small errors if the mapped points are slightly above the actual transition. The set of these distances forms the groove contour.

Various tip shapes and bittings near the tip of the key may affect the image of the grooves as seen by the groove camera 22. Therefore, it may be helpful to manipulate the groove data in an attempt to compute how the grooves would appear if the key blade was cut off square. To accommodate this manipulation, a scan of the outline data (from the outline camera 20 image) along the tip of the key may be performed with respect to a series lines that are parallel with the axis of the key. This yields a series of measurements that determine the distance from the edges of the tip of the key to some arbitrary squarely cut edge. These measurements may then be translated to the groove camera 22 image using a process described below. These translated key tip points 62 in the groove image 60 represent the tip of the key as if there were no grooves in the key. Differences between these points and the observed edge of the tip of the key in the groove image 60 represent the actual shape of the grooves as if the key blade was cut off square.

The final task of blank identification is to match the measured contour with the stored characteristics. The type of key 10 may be used to help match the contour with the appropriate data set. For symmetrical double sided keys the direction of the key insertion into the key identification system is irrelevant because the grooves and other features are symmetrical so a single characteristic reference image is stored for those symmetric keys. For most single sided keys, both sides of the key (referred to as left and right) are distinctive. In those cases, the characteristic reference images for each key includes a left and right view. When performing comparisons, right cuts are only matched to data for single cut blanks and only right cut data for those blanks. The data is also aligned so the key reference sides (e.g. in the case of a single sided key, the flat of the blank) are near each other. Often cut key data has many fewer data points so it is assumed data points opposite the reference side is where the metal (and data) have been removed. Double cut keys are matched based on the centerlines.

A series of comparisons may performed between the characteristic reference image that is stored in the database and the actual captured image to compensate for small registration errors. The comparison may be performed via a 2-D correlation analysis described in greater detail below. Specifically, the data may be moved a few data points in each direction. These points may then be compared and analyzed with the best result being chosen as the correct data point.

Small errors in image registration and performing the transpositions between the images can cause the contour data to be sloped up or down. This is called "roll" and is similar to an airplane roll where the wings are not level. Some level of roll is presumed to be dependent on unique machine set up details. To compensate for this roll, each key ID system may have a roll constant that is used to adjust its measured values. This insures that biases are not a factor when compared to stored data sets that were generated on other machines.

There also may be roll based on individual key scans. A second roll test may be used to insure the best possible match after the machine roll has been accounted for, and the best horizontal sliding position has been determined. Each comparison is done for as many as 40 different roll values to determine the best match. These calculations assure the comparison is done as accurately as possible. In other embodiments, larger numbers of roll values may be used to handle greater variation in the image captured by the groove camera 22.

Mathematical correlation may also be as the basis of contour comparison. The correlation may be done based on a standard formula. However, if a data point in the newly collected data or stored data is potentially in error it may be excluded from the correlation calculation. The actual data may have values larger than one as we begin the scan for groove edge data 8 pixels below the first expected transition point. Alternatively, different pixel offsets may be used based on the likelihood of erroneous data. If this data is set to −1 that point is excluded from the calculation. Some stored data is manually set to −1 to compensate for scan errors and to de-emphasize some features of the contours. Errors in edge detection can cause −1 values in the newly scanned data.

Other methods may be employed to compare the tip image to the reference contours. One method is to fit the contour inside an envelope based on the stored contours. Other techniques taking advantage of various basis functions are also suitable for performing the comparisons between the characteristic reference images and the captured image in order to obtain a match as well.

A secondary test may be added to the standard correlation calculation. Some key blanks have the same overall pattern of grooves, but the groove depths are exaggerated on some blanks more than others. Since correlation may be insensitive to scale, these blanks may be found to match even where there are large differences in actual groove depths. A second factor based on the standard deviation of the two contour data sets is used to aid in this differentiation. The factor is calculated by taking the difference between the two standard deviations and dividing it by the sum of the two values. This value is then subtracted from the correlation coefficient and a secondary test is performed. The resulting correlation results are used to provide an estimate as to which type of key is inserted into the key ID system. In an embodiment, the correlation results are used in conjunction with the key outline characterization to further narrow and reduce the type of key identified.

Both the standard correlation value and the adjusted correlation value are unitless and non-scaled numbers between 0 and 1. In order to provide more meaning to the values, each is rescaled to a scoring system of 0 to 100% where 0 is considered to be an impossible match and 100 is a perfect match. In an embodiment, standard correlations of 0.60 to 1.0 are rescaled to a score of 0 to 100% and adjusted correlations of 0.50 to 1.0 are rescaled to a score of 0 to 100%. Any correlations of less than the 0.60 and/or 0.50, respectively, are considered to be impossible matches. The total groove scanning score or correlation score may be a weighted average of these two individual scores.

The key ID system as described may be used in conjunction with other known key identification systems. For example, the key ID system may be used in conjunction with user interface identification systems, such as the object identification system disclosed in U.S. Publication No. 2004/0095380 and the key duplication system disclosed in U.S. Publication No. 2007/0224008, each of which are hereby incorporated by reference in their entirety.

The invention has been described above and, obviously, modifications and alternations will occur to others upon a reading and understanding of this specification. The claims as follows are intended to include all modifications and alterations insofar as they come within the scope of the claims or the equivalent thereof.

Having thus described the invention, we claim:

1. A key identification system comprising:
   an imaging system configured to capture an image of the tip of a master key at an angle between perpendicular and parallel to the black of said master key and not including perpendicular or parallel to the blade of said master key, wherein said captured image of said tip includes a contour of a groove in said master key; and
   a logic configured to analyze said captured image to determine characteristics of said groove based on said contour and further to compare said characteristics of said groove with groove characteristics of known key blanks to determine the likelihood of a match between said master key and a known key blank.

2. The key identification system of claim 1, wherein said logic includes a database containing data related to characteristics of grooves of known key blanks.

3. The key identification system of claim 1, wherein said imaging system includes a camera.

4. The key identification system of claim 1, wherein said imaging system includes a reflecting device.

5. The key identification system of claim 1, wherein said imaging system. includes a light.

6. The key identification system of claim 5, wherein said light is directed toward said reflecting device.

7. The key identification system of claim 5, wherein said light includes a shield to direct light away from said master key.

8. The key identification system of claim 1, wherein said captured image is a digital image.

9. The key identification system a claim 1, wherein said captured image comprises a silhouette of said tip of said master key.

10. The key identification system of claim 1, wherein said characteristics of said groove include the geometric shape of said groove.

11. The key identification system of claim 1, wherein said logic accounts for rolling of said master key with respect to said imaging system to determine characteristics of said groove.

12. The key identification system of claim 1, wherein said logic accounts for tilting of said master key with respect to said imaging system to determine characteristics of said groove.

13. The key identification system of claim 1, wherein said logic accounts for tipping of said master key with respect to said imaging system to determine characteristics of said groove.

14. The key identification system of claim 3 further comprising a mirror positioned to reflect an image of said master key to be captured by said camera.

15. The key identification system of claim 1 further comprising an overhead camera positioned above and approximately perpendicular to said master key.

16. The key identification system of claim 15, wherein said groove characteristics are determined based on image data from both said imaging system and said overhead camera.

17. The key identification system of claim 16, wherein said logic calculates the geometry of the groove contour as seen from a view of the tip parallel to the blade based on data from both said imaging system and said overhead camera.

18. The key identification system of claim 16, wherein said logic calculates the geometry of the groove contour as though the tip were squarely cut based on data from both said imaging system and said overhead camera.

19. The key identification system of claim 1 further comprising a key holder configured to hold said master key.

20. The key identification system of claim 19, wherein said key holder includes a lower support.

21. The key identification system of claim 20, wherein said key holder includes an upper door.

22. The key identification system of claim 19, wherein said key holder includes a clamp.

23. The key identification system of claim 3, wherein said camera is positioned above the blade of said key and configured to capture an image of a groove in the bottom of said blade.

* * * * *

UNITED STATES PATENT AND TRADEMARK OFFICE
CERTIFICATE OF CORRECTION

| | | |
|---|---|---|
| PATENT NO. | : 8,644,619 B2 | Page 1 of 1 |
| APPLICATION NO. | : 12/772709 | |
| DATED | : February 4, 2014 | |
| INVENTOR(S) | : Chester O. D. Thompson et al. | |

It is certified that error appears in the above-identified patent and that said Letters Patent is hereby corrected as shown below:

In the Claims

Column 10, line 32, delete "black" and insert --blade--

Signed and Sealed this
Ninth Day of September, 2014

Michelle K. Lee
*Deputy Director of the United States Patent and Trademark Office*